US009133981B2

(12) United States Patent
Lenherr (10) Patent No.: US 9,133,981 B2
(45) Date of Patent: Sep. 15, 2015

(54) HANGER SYSTEM FOR SUSPENDIBLE ILLUMINATED FIXTURES (71) Applicant: Pendant Systems Manufacturing Co., Bensalem, PA (US)

(72) Inventor: Michael C. Lenherr, Bensalem, PA (US)

(73) Assignee: Pendant Systems Manufacturing Co., Bensalem, PA (US)

( * ) Notice: Subject to any disclaimer, the term of this patent is extended or adjusted under 35 U.S.C. 154(b) by 0 days.

(21) Appl. No.: 14/353,297

(22) PCT Filed: Nov. 6, 2013

(86) PCT No.: PCT/US2013/068727
§ 371 (c)(1),
(2) Date: Apr. 22, 2014

(87) PCT Pub. No.: WO2014/171972
PCT Pub. Date: Oct. 23, 2014

(65) Prior Publication Data
US 2015/0176760 A1 Jun. 25, 2015

Related U.S. Application Data (60) Provisional application No. 61/813,708, filed on Apr. 19, 2013, provisional application No. 61/811,964, filed on Apr. 15, 2013.

(51) Int. Cl.
*F21V 21/104* (2006.01)
*F16M 13/02* (2006.01)
(Continued)

(52) U.S. Cl.
CPC ........... *F16M 13/022* (2013.01); *F16M 13/027* (2013.01); *F21S 8/043* (2013.01);
(Continued)

(58) Field of Classification Search
CPC ............. F21S 8/061; F21S 8/06; F21S 8/063; F21S 8/043; F21V 21/008; F21V 21/03; F21V 21/02; F21V 21/112; F21V 21/116; F21V 21/104; H02G 3/20
USPC ........................................................ 248/317
See application file for complete search history.

(56) References Cited

U.S. PATENT DOCUMENTS 1,199,587 A * 9/1916 Manwaring .................... 248/317
1,272,843 A * 7/1918 Pape .............................. 362/86
(Continued)

FOREIGN PATENT DOCUMENTS

CA 2343565 A1 * 10/2002
DE 29501156 * 3/1995
(Continued)

*Primary Examiner* — Terrell McKinnon
*Assistant Examiner* — Eret McNichols
(74) *Attorney, Agent, or Firm* — Michael Crilly, Esquire (57) ABSTRACT A hanger system for the secured attachment of an illuminated fixture to a load bearing element is presented. The hanger system includes a crossbar, a canopy, and at least two cables. The crossbar further includes at least two sockets each having a first slot. The canopy is disposed along and contacts one side of the crossbar. The canopy further includes at least two second slots. Each first slot is separately aligned with one second slot. Each cable includes an anchor at a first end. Each anchor is rotatably disposed within one socket so that the cable extends through the first and second slots. The cable is rotatably disposed within the paired arrangement of slots. Each cable also has a second end attachable to the illuminated fixture. The hanger system could further include optional features such as a power cord or a stem. The stem may be configured in a fixed or rotational arrangement between crossbar and illuminated fixture.

21 Claims, 13 Drawing Sheets (51) Int. Cl.
*F21S 8/06* (2006.01)
*F21V 21/008* (2006.01)
*F21V 21/03* (2006.01)
*F21V 21/02* (2006.01)
*F21V 21/112* (2006.01)
*H02G 3/20* (2006.01)
*F21V 21/116* (2006.01)
*F21V 21/32* (2006.01)
*F21V 21/34* (2006.01)
*F21S 8/04* (2006.01)

(52) U.S. Cl.
CPC . *F21S 8/06* (2013.01); *F21S 8/061* (2013.01); *F21S 8/063* (2013.01); *F21V 21/008* (2013.01); *F21V 21/02* (2013.01); *F21V 21/03* (2013.01); *F21V 21/104* (2013.01); *F21V 21/112* (2013.01); *F21V 21/116* (2013.01); *F21V 21/32* (2013.01); *F21V 21/34* (2013.01); *H02G 3/20* (2013.01)

(56) References Cited

U.S. PATENT DOCUMENTS

| | | | |
|---|---|---|---|
| 1,731,942 A | 9/1926 | Simmons | |
| 2,336,414 A * | 12/1943 | Mitchell | 362/260 |
| 2,545,124 A | 3/1951 | Tornblom | |
| 2,739,780 A | 3/1956 | Richards | |
| 2,762,598 A * | 9/1956 | Runge | 248/327 |
| 3,506,232 A | 4/1970 | Wolar et al. | |
| 4,138,716 A * | 2/1979 | Muhlethaler et al. | 362/375 |
| 4,358,817 A | 11/1982 | Bielemeier | |
| 5,317,493 A * | 5/1994 | Muller et al. | 362/407 |
| 5,387,066 A * | 2/1995 | Zekowski | 411/390 |
| 5,440,469 A * | 8/1995 | Gomes | 362/648 |
| 6,089,733 A * | 7/2000 | Chen | 362/407 |
| 6,517,222 B1 | 2/2003 | Orlov | |
| 6,761,342 B1 * | 7/2004 | Giefer et al. | 248/343 |
| 6,935,600 B1 * | 8/2005 | Barrepski | 248/317 |
| 6,945,676 B1 | 9/2005 | Scott | |
| 7,213,938 B2 * | 5/2007 | Brondt et al. | 362/225 |
| 7,287,883 B1 | 10/2007 | Plunk et al. | |
| 8,097,804 B1 | 1/2012 | Briski et al. | |
| D714,996 S * | 10/2014 | Trotter et al. | D26/140 |
| 2003/0137835 A1 | 7/2003 | Mier-Langner et al. | |
| 2006/0176683 A1 * | 8/2006 | Chien | 362/153 |
| 2007/0147053 A1 | 6/2007 | Gagne et al. | |
| 2012/0257388 A1 * | 10/2012 | Bracher et al. | 362/249.01 |
| 2013/0094230 A1 * | 4/2013 | Verfuerth et al. | 362/396 |
| 2013/0153731 A1 | 6/2013 | Engstrom et al. | |
| 2013/0223073 A1 * | 8/2013 | Hayashi et al. | 362/249.02 |
| 2013/0235591 A1 * | 9/2013 | Smith | 362/311.03 |
| 2013/0241380 A1 * | 9/2013 | Townsend, Jr. | 312/237 |
| 2013/0286637 A1 * | 10/2013 | Lay et al. | 362/147 |
| 2015/0176761 A1 * | 6/2015 | Lenherr | 248/328 |

FOREIGN PATENT DOCUMENTS

| | | | | |
|---|---|---|---|---|
| DE | 29506941 | * | 7/1995 | |
| DE | 20000695 U1 | * | 6/2000 | |
| DE | 102009015290 A1 | * | 11/2010 | F21V 21/112 |
| DE | 20214104901 | * | 12/2014 | |
| FR | 2647139 A1 | | 11/1990 | |
| GB | 190272 | * | 12/1922 | |
| JP | 3082833 U | | 10/2001 | |
| JP | 2008-071604 A | | 3/2008 | |
| KR | 20-0377596 Y1 | | 3/2005 | |
| KR | 10-2011-0131999 A | | 12/2011 | |
| KR | 10-1221654 B1 | | 1/2013 | |
| WO | WO 03027570 A1 | * | 4/2003 | |
| WO | WO 2005124290 A2 | * | 12/2005 | G01D 11/28 |
| WO | WO 2009109287 A1 | * | 9/2009 | |
| WO | WO 2011055659 A1 | * | 5/2011 | |
| WO | WO 2014067231 A1 | * | 5/2014 | |

* cited by examiner

HANGER SYSTEM FOR SUSPENDIBLE ILLUMINATED FIXTURES

CROSS REFERENCE TO RELATED APPLICATIONS

This application is based upon and claims priority from Patent Cooperation Treaty Application No. PCT/US2013/068727 filed Nov. 6, 2013 entitled Hanger System for Suspendible Illuminated Fixtures which further claims priority from U.S. Provisional Application No. 61/813,708 filed Apr. 19, 2013 and U.S. Provisional Application No. 61/811,964 filed Apr. 15, 2013, both entitled Hanger System for Illuminated Fixtures. The subject matters of the prior applications are incorporated in their entirety herein by reference thereto.

FEDERALLY SPONSORED RESEARCH AND DEVELOPMENT

None.

BACKGROUND OF THE INVENTION

1. Field of the Invention

The invention generally relates to a hanger for use with illuminated fixtures and more particularly is concerned, for example, with a hanger system facilitating attachment of an illuminated fixture to a ceiling, a junction box, or other load bearing element whereby a fixture is secured in a suspended fashion.

2. Background

A variety of hanger systems are presently available facilitating suspension of an illuminated fixture from a substantially horizontal load bearing element.

Presently known hanger systems are difficult to implement. Some systems are complex and include numerous parts. Other systems are problematic in terms of adequately securing and leveling a suspended illuminated fixture. With yet other systems, retrofit from single-point mounted fixtures with high-intensity discharge (HID) lamps to next generation T-5 fluorescent lighting systems is challenging because of the larger footprint of the new systems. As such, presently known hangers provide solutions which are labor intensive and correspondingly expensive.

Presently know hanger systems do not adequately address the aesthetics of suspended illuminated fixtures. For example, electrical wiring is often communicated from a ceiling or other building element to an illuminated fixture with little or no regard to appearance. This approach is acceptable when an illuminated fixture is surrounded within a drop ceiling or other means of concealment. However, present lighting trends include free-standing illuminated fixtures with little or no concealment features.

Accordingly, what is required is a hanger system which simplifies installation of an illuminated fixture and minimizes the unsightly appearance of electrical wiring otherwise viewable with free-standing, suspended illuminated fixtures.

SUMMARY OF THE INVENTION

An object of the invention is to provide a hanger system which simplifies installation of an illuminated fixture and minimizes the unsightly appearance of electrical wiring otherwise viewable with free-standing, suspended illuminated fixtures.

In accordance with embodiments of the invention, the hanger system for a suspendible illuminated fixture includes a crossbar, a canopy, and at least two cables. The crossbar further includes at least two sockets each having a first slot. The canopy is disposed along and contacts one side of the crossbar. The canopy further includes at least two second slots. Each first slot is substantially aligned with one second slot. Each cable includes an anchor at a first end. Each anchor is rotatably disposed within one socket so that the cable extends through the first and second slots. The cable is rotatably disposed within the paired arrangement of slots. Each cable also has a second end attachable to the suspendible illuminated fixture.

In accordance with other embodiments of the invention, the second end of the cable is fastened to the illuminated fixture.

In accordance with other embodiments of the invention, the second end of the cable is fastened to the illuminated fixture via a gripper.

In accordance with other embodiments of the invention, the second end is fastened to the illuminated fixture via a cable assembly.

In accordance with other embodiments of the invention, the cable assembly includes a second cable with a pair of paddles separately attached thereto.

In accordance with other embodiments of the invention, the hanger system further includes a power cord. The power cord passes through the crossbar and the canopy. The sockets are disposed about the power cord. The power cord is electrically connectable to the suspendible illuminated fixture.

In accordance with other embodiments of the invention, the hanger system further includes a stem. The stem is interposed between the crossbar and the suspendible illuminated fixture. The power cord passes through the stem.

In accordance with other embodiments of the invention, the hanger system further includes a mounting plate. The mounting plate is disposed adjacent to an opening along the canopy. The stem is fastened at one end to the mounting plate and at another end to the suspendible illuminated fixture.

In accordance with other embodiments of the invention, the hanger system further includes a mounting plate and a stem. The mounting plate is disposed adjacent to an opening along the crossbar. The stem is interposed between the crossbar and the suspendible illuminated fixture. The stem has a ball at one end that rotatably contacts the mounting plate. The stem is fastened at other end to the suspendible illuminated fixture. The power cord passes through the stem.

In accordance with other embodiments of the invention, a swivel clip is attached to the mounting plate. The swivel clip limits non-rotational movement of the ball with respect to the crossbar and the canopy.

In accordance with other embodiments of the invention, a stem is interposed between the crossbar and the suspendible illuminated fixture. The stem has a ball at one end rotatably disposed with respect to the canopy. The stem is fastened at another end to the suspendible illuminated fixture. The power cord passes through the stem.

In accordance with other embodiments of the invention, the stem is a rigid element.

In accordance with other embodiments of the invention, the stem is a flexible element.

In accordance with other embodiments of the invention, the suspendible illuminated fixture is a light fixture.

In accordance with other embodiments of the invention, the suspendible illuminated fixture is a display.

Several advantages are offered by the invention. The invention minimizes the labor and costs associated with installation of an illuminated fixture by facilitating mounting to existing junction boxes and by avoiding rerouting of electrical wiring. The invention simplifies balance of illuminated fixtures that may be otherwise unbalanced due to design or manufacture. The invention facilitates secured attachment of electrical wiring thereby improving the aesthetics above an illuminated fixture. The invention is applicable to center-mounted cord and stem feed fixtures. The invention minimizes the adverse effects to an illuminated fixture caused by air flow. The invention maximizes adaptability allowing use with a variety of illuminated fixtures and mounting configurations therefore.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that such features may be combinable to form other additional embodiments.

Figure 1:
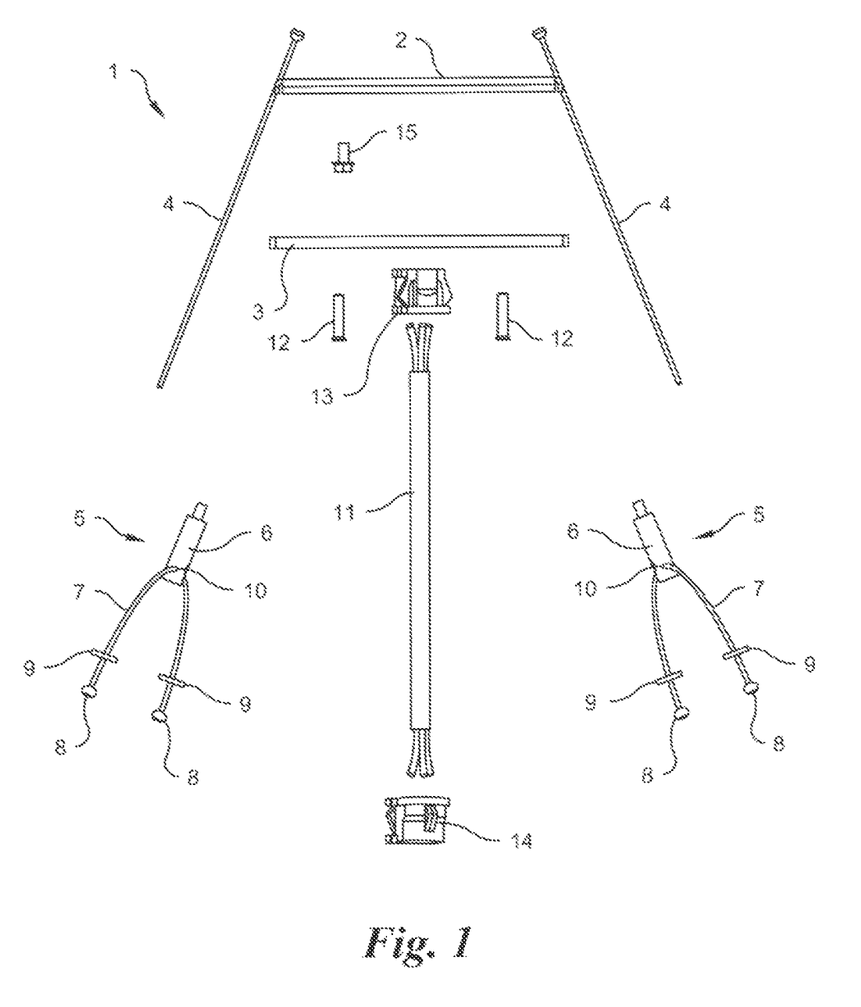
FIG. 1 is an exploded side view illustrating a hanger system in accordance with an embodiment of the invention.
Figure 2:
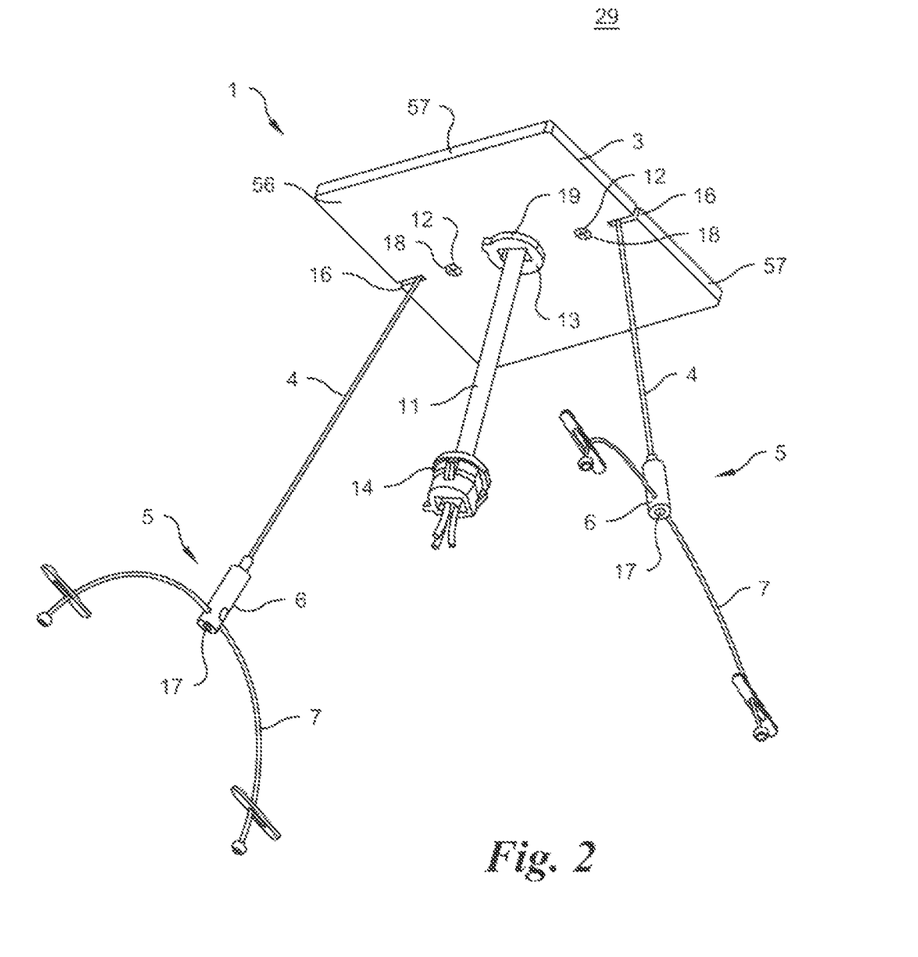
FIG. 2 is a perspective view illustrating a hanger system in accordance with an embodiment of the invention.

Referring now to FIGS. 1 and 2, the hanger system 1 is shown including a crossbar 2, a canopy 3, and at least two cables 4 with optional cable assemblies 5.

The crossbar 2 is a generally planar element. At least two cables 4 are fastened to the crossbar 2 as otherwise described herein. The cables 4 hang downward from the crossbar 2 and away from a mounting structure 29 to which the crossbar 2 is attached. The mounting structure 29 could include, but is not limited to, a junction box, ceiling, or other load bearing element. The crossbar 2 is secured to the mounting structure 29 via means understood in art. A ground screw 15 may be fastened to an opening along the crossbar 2. A wire from the power cord 11 could be mechanically fastened to the ground screw 15 so as to electrically ground an illuminated fixture 46 (not shown).

The crossbar 2 may be concealed from view by a canopy 3. The canopy 3 is a generally planar element which provides at least an aesthetically neutral appearance. In some embodiments, the canopy 3 could include designs, ornamentation, or other decorative features. The canopy 3 could be fastened to the crossbar 2 by a pair of mounting screws 12. The mounting screws 12 separately reside within holes 18 along the canopy 3 and holes 22 along the crossbar 2, the latter shown in FIG. 3a. A paired arrangement of holes 18, 22 enables a mounting screw 12 to traverse both crossbar 2 and canopy 3 thereby facilitating attachment of the canopy 3 to the crossbar 2. The canopy 3 further includes a slot 16 immediately adjacent to each socket 21 disposed along the crossbar 2, the latter shown in FIGS. 4a, 4b. The cable 4 passes through the slot 16 so as to extend from the canopy 3.

A pair of strain reliefs 13, 14 is provided along the power cord 11. One strain relief 13 is mechanically fastened to a hole 19 along the canopy 3 so as to secure the power cord 11 to the canopy 3. Another strain relief 14 facilitates attachment of the power cord 11 to an illuminated fixture 46 (not shown). In one non-limiting example, strain reliefs 13, 14 could allow for a snap-fit like attachment of a power cord 11 to a hole. The lengths of the power cord 11 and cables 4 are application dependent based on such factors, by way of example only, as the fixture design, fixture type, fixture size, mounting hardware, and mounting locations.

Figure 11:
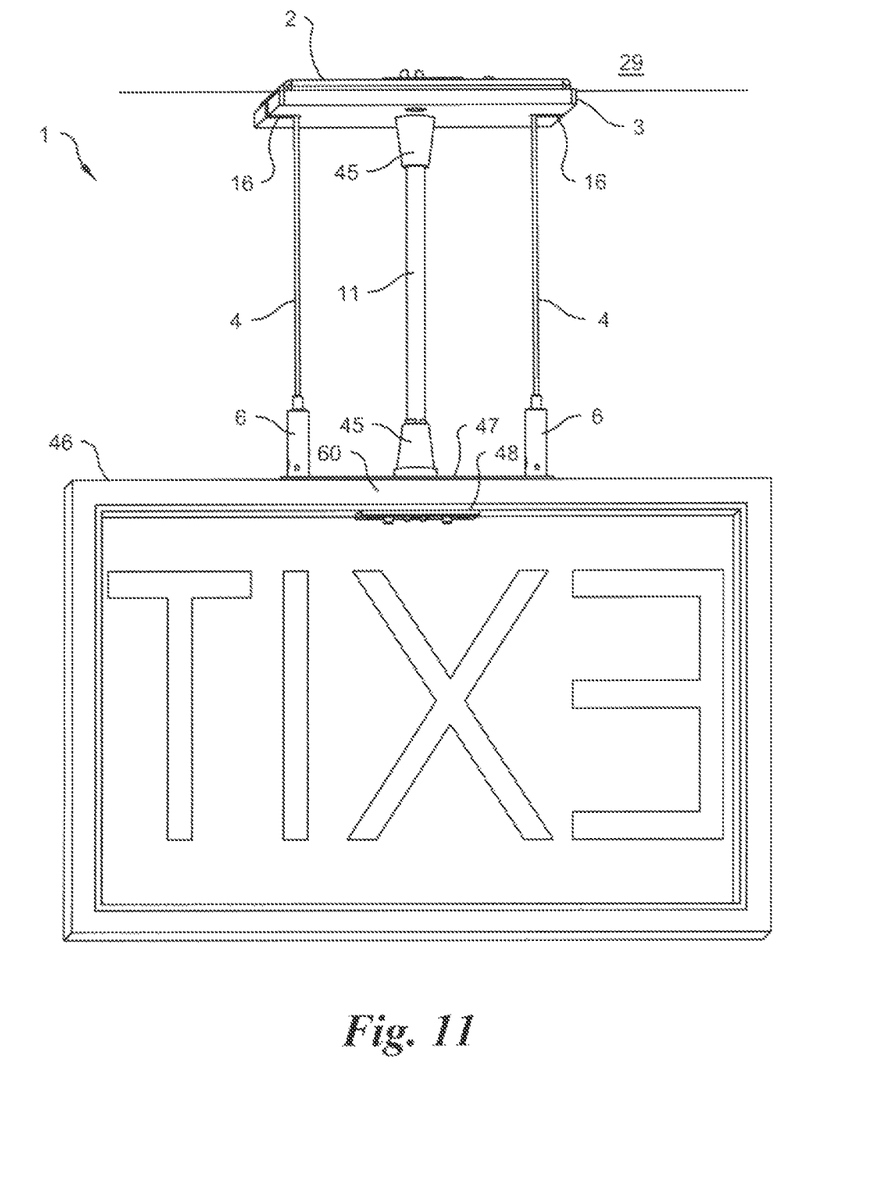
FIG. 11 is a side elevation view illustrating a hanger system with an illuminated fixture in accordance with an embodiment of the invention.
Figure 13:
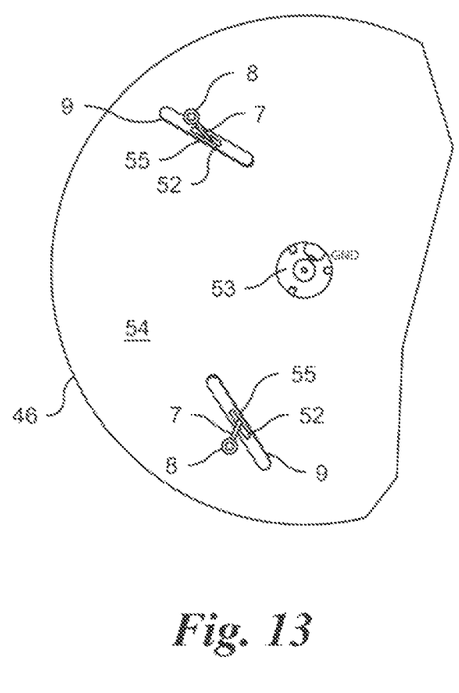
FIG. 13 is a plan view illustrating indirect attachment of a cable via a cable assembly to an illuminated fixture in accordance with an embodiment of the invention.

A second end of each cable 4 could be mechanically fastened to a cable assembly 5. In some embodiments, each cable assembly 5 could include only a gripper 6. The gripper 6 could be directly fastened to an illuminated fixture 46, as represented in FIG. 11. In other embodiments, a cable 7 could pass through a channel 10 along the gripper 6 so that the gripper 6 is interposed between the ends of the cable 7. The cable 7 could be mechanically fastened to the gripper 6 via a screw 17 which engages an opening at one end of the gripper 6 allowing mechanical contact between the cable 7 and screw 17 within the gripper 6. An anchor 8 could be mechanically secured to each end of the cable 7 or immediately adjacent thereto. The anchors 8 should be shaped so as to allow for rotational movement with respect to a contact surface. For example, each anchor 8 could be substantially ball shaped so as to allow for angular motion between an anchor 8 and a substantially complementary-shaped surface. A paddle 9 could be interposed in a slidable arrangement between the gripper 6 and each anchor 8. The cable 7, paddles 9, anchors 8, and gripper 6 enable indirect fastening of a cable 4 to an illuminated fixture 46, as represented in FIG. 13.

Figures 3A, 3B:
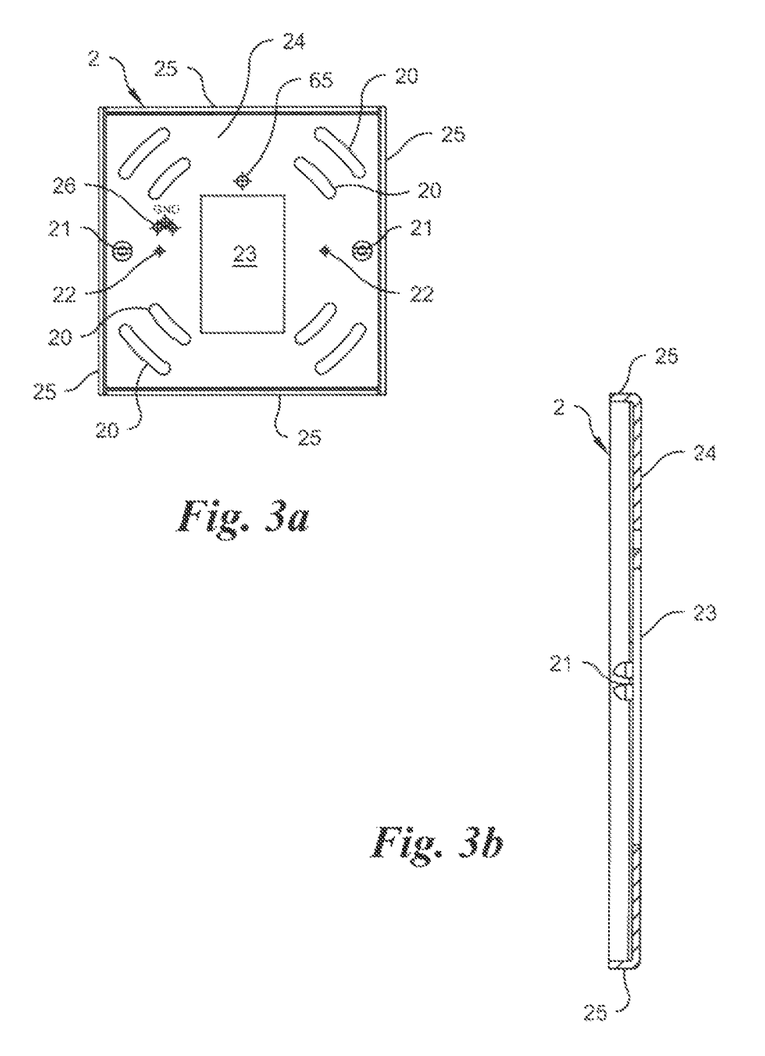
FIG. 3a is a plan view illustrating a crossbar from a hanger system in accordance with an embodiment of the invention.
FIG. 3b is a partial section view illustrating a crossbar from a hanger system in accordance with an embodiment of the invention.

Referring now to FIGS. 3a and 3b, the crossbar 2 includes a base 24 and side flanges 25. The base 24 is a generally planar element. Each side of the base 24 could include a side flange 25. Each side flange 25 could be oriented in a substantially perpendicular arrangement with respect to the base 24, although other orientations are possible. The height of the side flange 25 is design dependent and based in part on the components positioned between the crossbar 2 and canopy 3 as may be required for mounting and/or operation of an illuminated fixture 46. The canopy 3 could include a similar construction with a base 56 and side flanges 57, as represented in FIG. 2. The side flanges 57 along the canopy 3 could at least partially overlap or cover the side flanges 25 along the crossbar 2 so as to separate the base 24 along the crossbar 2 from the base 56 along the canopy 3.

The crossbar 2 could include a plurality of mounting slots 20, holes 22, 26, an optional opening 23, at least two sockets 21, and a hole 65. The mounting slots 20 are arranged about the crossbar 2. Each mounting slot 20 should be sufficiently wide so as to allow the shank of a screw or other fastening device to fit through the slot 20, yet sufficiently narrow so that the head of a fastener mechanically engages the crossbar 2 when the crossbar 2 is secured to a mounting structure 29, the latter represented in FIG. 2. The holes 22 are substantially aligned with the holes 18 along the canopy 3, the latter shown in FIG. 2. The structure about the holes 22 could contact and engage threads along the mounting screws 12 so as to fasten the canopy 3 to the crossbar 2. The hole 26 allows for attachment of a ground screw 15. The structure about the hole 26 could contact and engage threads along the ground screw 15 so as to secure the ground screw 15 to the crossbar 2. The opening 23 is provided in some embodiments so as to allow for mounting of a mounting plate 33 and related elements to the crossbar 2, the latter represented in FIG. 7.

Figure 4A:
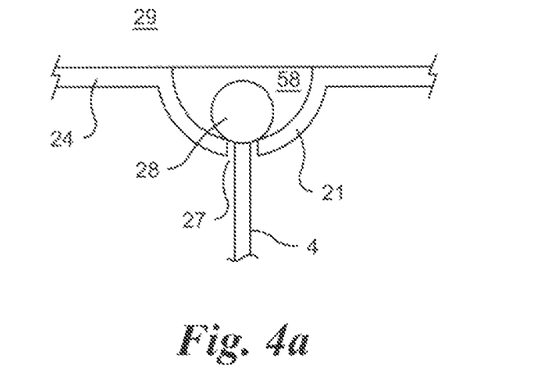
FIG. 4a is an enlarged section view illustrating a socket with a slot disposed along a crossbar with an anchor rotatably disposed within the socket and a cable attached to the anchor passing through and extending from the slot in accordance with an embodiment of the invention.
Figure 4B:
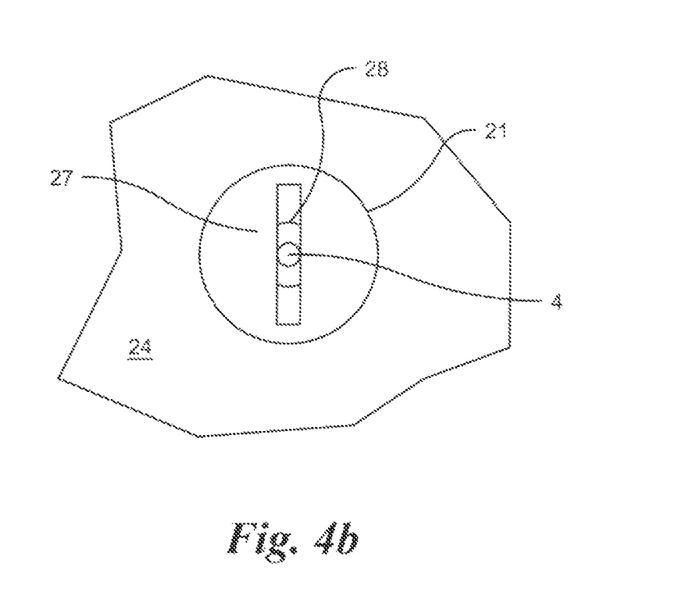
FIG. 4b is an enlarged plan view illustrating a slot disposed along a socket such that an anchor with a cable is viewable through the slot in accordance with an embodiment of the invention.

Referring now to FIGS. 3b, 4a, and 4b, each socket 21 could be a depression along the base 24 of the crossbar 2. While a variety of shapes are possible for the depression, it is preferred for a socket 21 to be generally curved or complement the shape of the anchor 28, as represented in FIG. 4a. Sockets 21 are oriented so as to extend into the cavity formed by the base 24 and side flanges 25. This arrangement ensures that each socket 21 opens outward from the base 24. Sockets 21 are positioned along the base 24, preferably at locations which allow for proper attachment and leveling of an illuminated fixture 46 (not shown) based on the size, weight, and other characteristics of an illuminated fixture 46.

Each socket 21 includes a slot 27 that traverses at least a portion of the socket 21. A slot 27 could be a generally linear-shaped opening as shown in FIG. 4b; however, other designs and shapes are possible. By way of example only, a socket 21 could include one or more linear or non-linear feature(s). In some embodiments, it is possible for the slot 27 to extend beyond the socket 21 so as to partially reside along a portion of the base 24.

Each socket 21 forms a pocket 58 when the crossbar 2 is mounted to a mounting structure 29. Each pocket 58 is preferred to be dimensionally larger than an anchor 28, as represented in FIG. 4a, thus allowing the anchor 28 to be rotatable and/or slidable within the pocket 58. A cable 4 attached to the anchor 28 passes through the slot 27. The slot 27 should be sufficiently wide so as to allow the cable 4 to freely rotate within and slide along the slot 27, yet sufficiently narrow to prevent the anchor 28 from passing through the slot 27. Each slot 27 is generally positioned immediately adjacent and parallel to a slot 16 along the canopy 3 so as to allow the cable 4 to freely rotate and translate within both slots 16, 27. The slots 16, 27 should be sufficiently long so as to allow for adjustments to the orientation and positioning of each cable 4 during installation of an illuminated fixture 46. A slot 16 may extend to the edge of the canopy 3, as represented in FIG. 2, or may partially extend along the canopy 3 so as to terminate at a distance from the end of the canopy 3. A slot 27 may also extend to the edge of the crossbar 2 or may partially extend along the crossbar 2 so as to terminate at a distance from the end of the crossbar 2, the latter represented in FIGS. 3a, 4b. It is understood that the slots 16, 27 should at least partially overlap so that a cable 4 may traverse the slots 16, 27 and therein be rotatable at least partially along a portion of each slot 16, 27.

Figure 5:
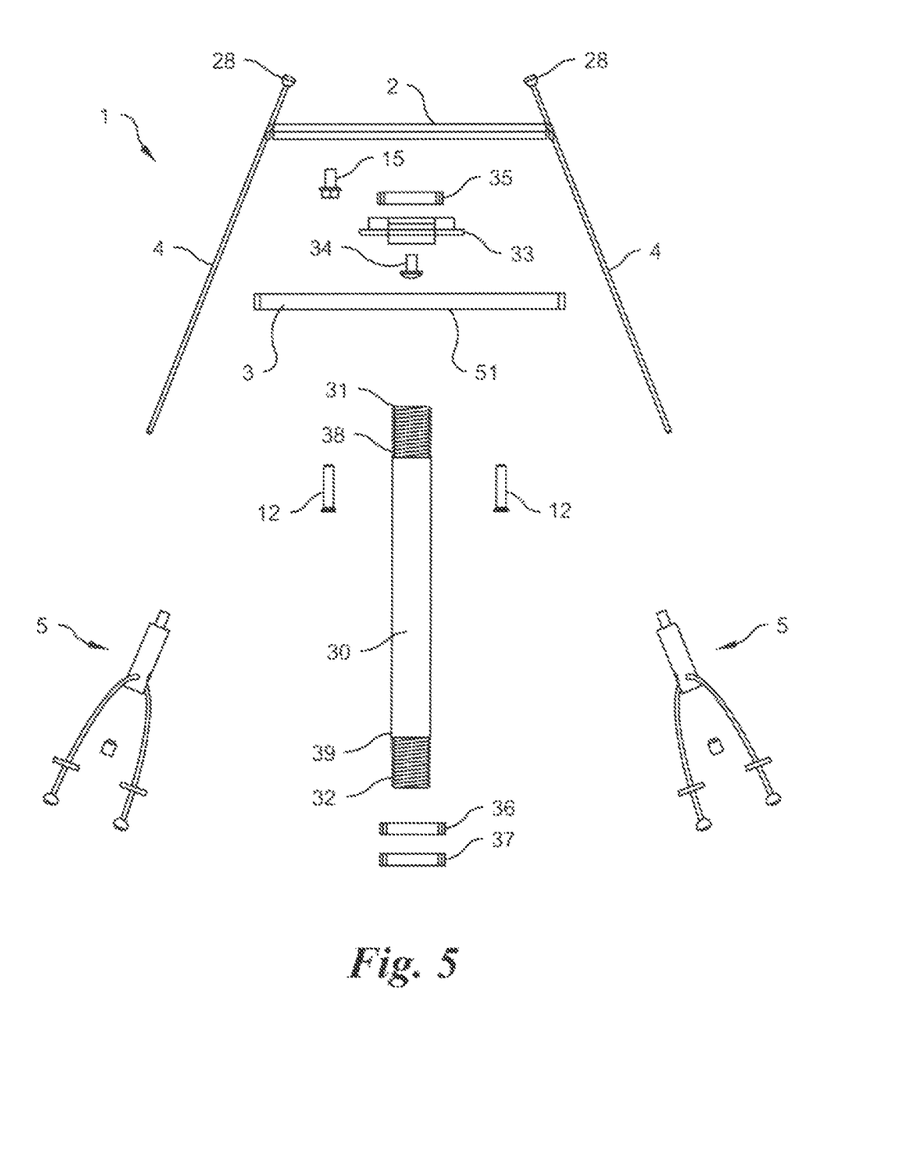
FIG. 5 is an exploded side view illustrating a hanger system including a stem in accordance with an embodiment of the invention.
Figure 6:
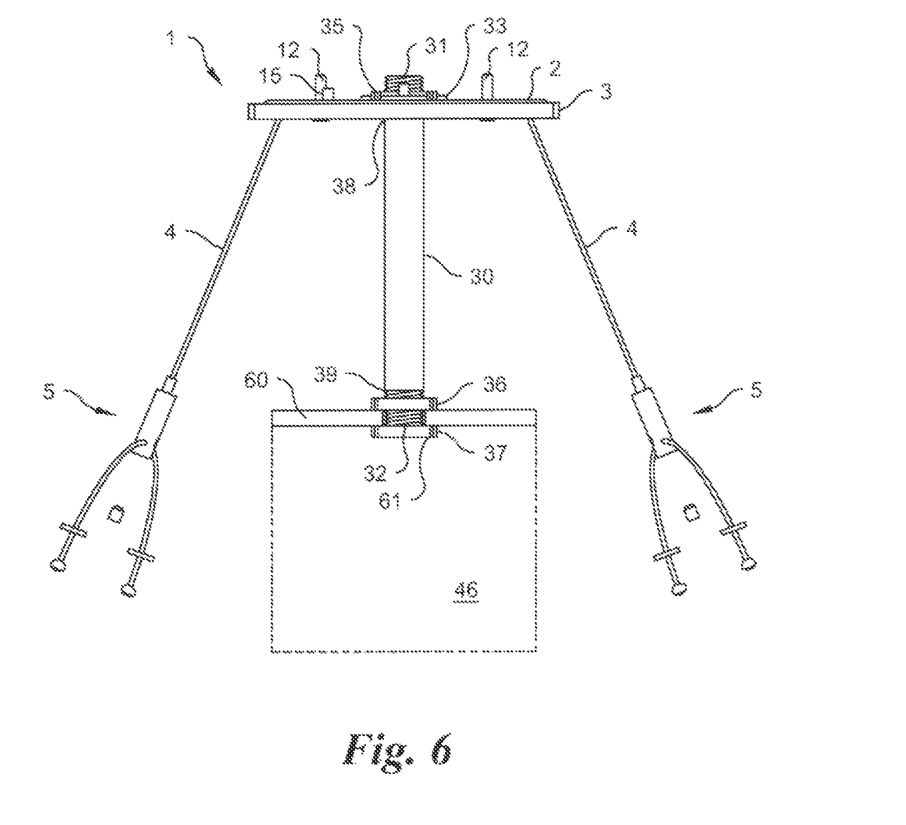
FIG. 6 is a side elevation view illustrating a hanger system including a stem in accordance with an embodiment of the invention.
Figure 7:
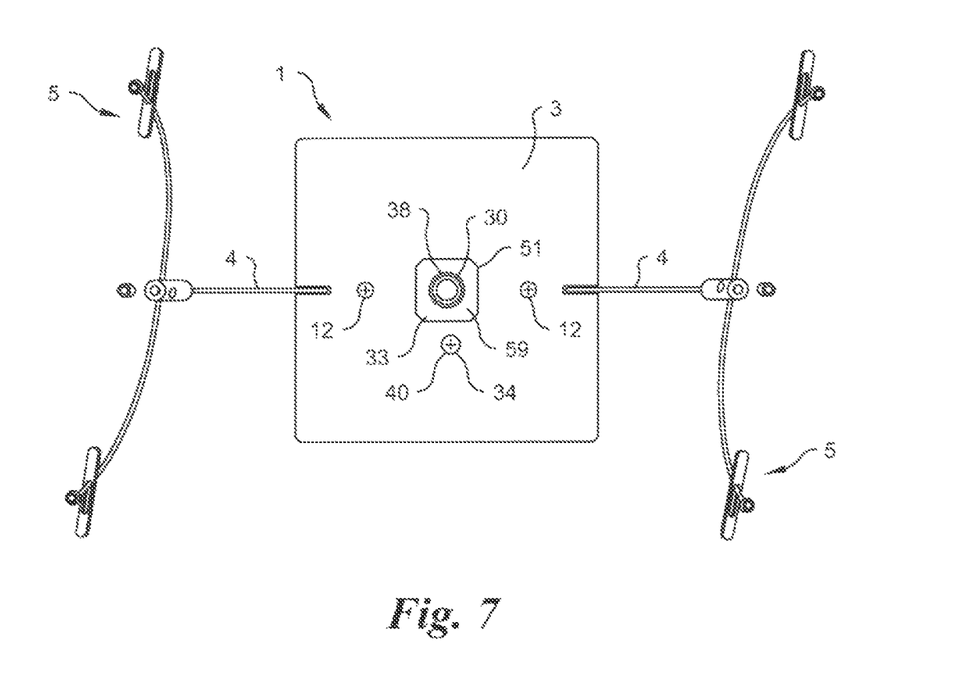
FIG. 7 is a plan view illustrating the exterior side of a hanger system including a stem in accordance with an embodiment of the invention.

In some embodiments, it might be advantageous for the hanger system 1 to conceal or protect a power cord 11 between the canopy 3 and an illuminated fixture 46. Referring now to FIGS. 5-7, a stem 30 is attached at one end to a canopy 3 and at another end to an illuminated fixture 46. It is also possible for the stem 30 to be attached to a crossbar 2. The stem 30 could be an elongated tube-shaped element composed of a rigid or flexible material. Exemplary rigid materials are steel and aluminum. Exemplary flexible materials are plastics and rubber. The stem 30 may or may not be loading bearing. The lengths of the stem 30 and cables 4 are application dependent based on such factors, by way of example only, as the fixture design, fixture type, fixture size, mounting hardware, and mounting locations. The canopy 3 is secured to the crossbar 2 via mounting screws 12 and the illuminated fixture 46 electrically grounded via the ground screw 15, as otherwise described herein.

A threaded section 31, 32 is provided at each end of the stem 30. Each threaded section 31, 32 ends at a shoulder 38, 39, respectively. In some embodiments, one threaded section 31 could pass through like-sized openings along the crossbar 2 and canopy 3 so that the shoulder 38 engages the canopy 3, as represented in FIG. 6. A locknut 35 is then secured to the threaded section 31 so as to fasten the stem 30 to the crossbar 2 and canopy 3 between the locknut 35 and shoulder 38. In yet other embodiments, the canopy 3 could include an opening 51 generally larger than the cross-sectional dimensions of the stem 30, as represented in FIGS. 5 and 7. A mounting plate 33 could be fastened to the canopy 3 so as to reside within the opening 51. In one exemplary embodiment, the mounting plate 33 could be secured to the canopy 3 via a mounting screw 34 that traverses a hole 40 along the canopy 3 and engages threads along another hole through the mounting plate 33. One threaded section 31 could pass through a like-sized opening 59 along the mounting plate 33 and crossbar 2 so that the shoulder 38 engages the mounting plate 33, as represented in FIG. 7. A locknut 35 is then secured to the threaded section 31 so as to fasten the stem 30 to the mounting plate 33, and indirectly to the canopy 3, and the crossbar 2 between the locknut 35 and shoulder 38.

Another end of the stem 30 could be mechanically fastened to a panel or wall 60 of an illuminated fixture 46 via a pair of locknuts 36, 37. One locknut 36 is threaded onto the threaded section 32 and positioned as required from the shoulder 39. The threaded section 32 is then passed through a like-sized hole 61 along the wall 60. The second locknut 37 is then threaded onto the threaded section 32 so as to fasten the stem 30 to the illuminated fixture 46 between the locknuts 36, 37.

The cables 4, with or without cable assembly 5, are attached to the illuminated fixture 46 as described herein. An anchor 28 is located at the end of each cable 4 and contacts a socket 21, as otherwise described herein.

Figure 8:
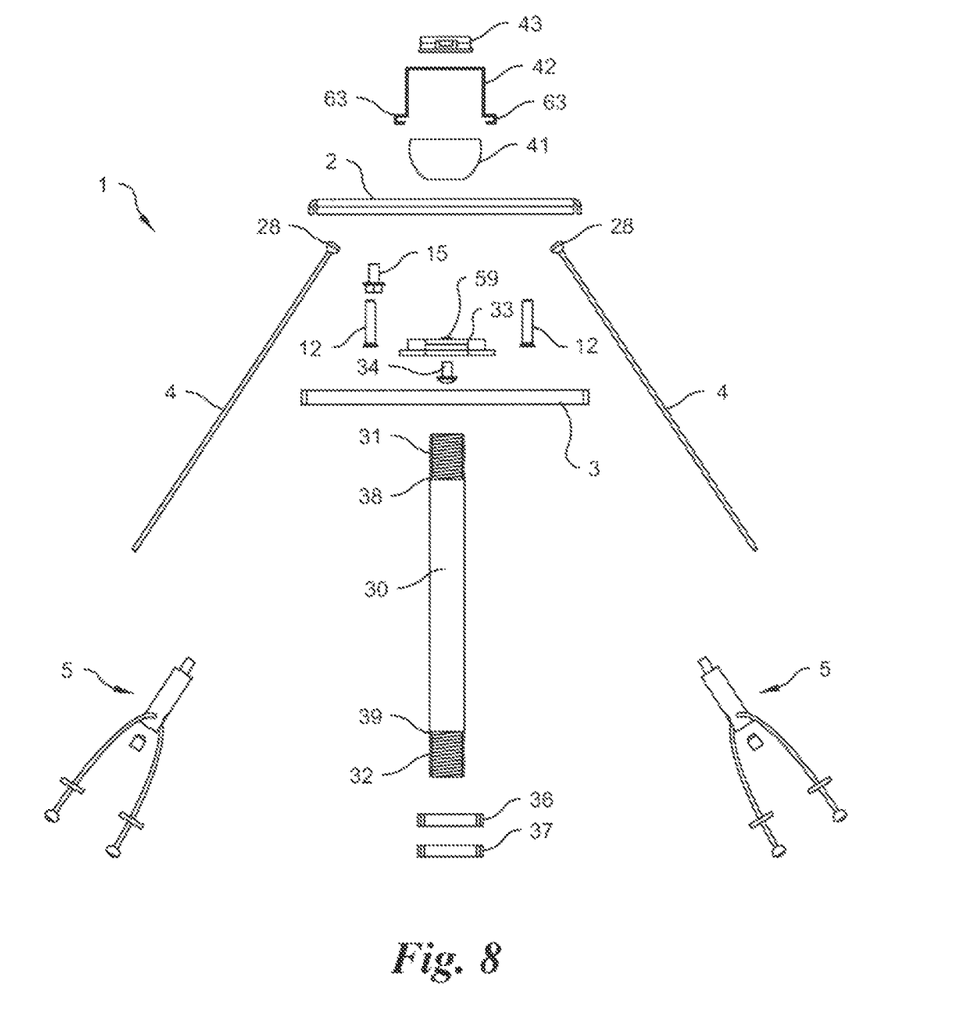
FIG. 8 is an exploded side view illustrating a hanger system including a rotatable stem in accordance with an embodiment of the invention.
Figure 9:
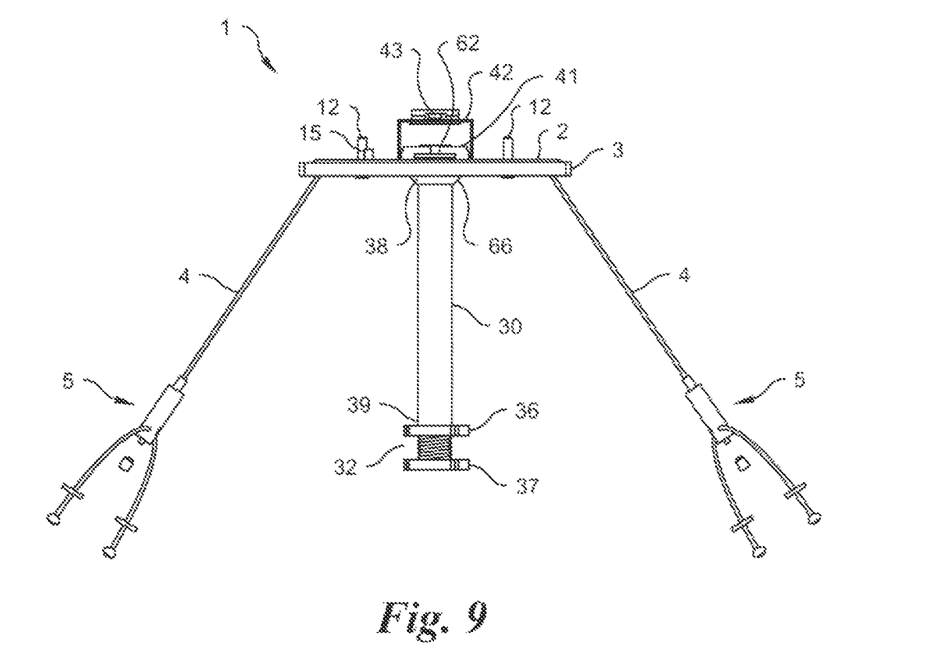
FIG. 9 is a side elevation view illustrating a hanger system including a rotatable stem in accordance with an embodiment of the invention.
Figure 10:
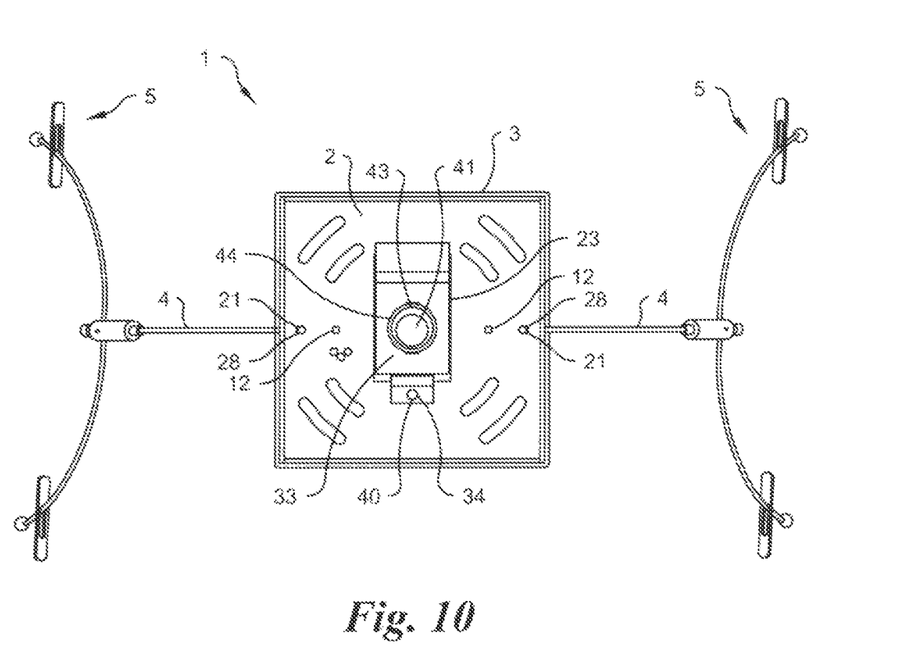
FIG. 10 is a plan view illustrating the interior side of a hanger system including a rotatable stem in accordance with an embodiment of the invention.

In some embodiments, it might be advantageous for the hanger system 1 to include a rotatable stem 30 so as to allow for additional adjustability during installation of an illuminated fixture 46. Referring now to FIGS. 8-10, a ball 41 is attached at one end of the stem 30. The ball 41 is a generally circular element which allows for rotation of the stem 30 with respect to the crossbar 2 and canopy 3. The ball 41 could contact a mounting plate 33 so as to be rotatable with respect thereto. The canopy 3 is secured to the crossbar 2 via mounting screws 12 and the illuminated fixture 46 (not shown) electrically grounded via the ground screw 15, as described herein. The mounting plate 33 may be attached to the canopy 3 as described herein or to the crossbar 2. With regard to the latter, the mounting plate 33 could reside within the opening 23 along the crossbar 2. The mounting plate 33 could be secured to the crossbar 2 via a mounting screw 34 secured to a hole 40 along the mounting plate 33 and to a hole 65 along the crossbar 2, whereby the holes 40, 65 are mutually aligned (hole 65 shown in FIG. 3a). The stem 30 passes through an opening 66 through the canopy 3. The opening 66 should be sufficiently large so as to allow the stem 30 to rotate with respect to the canopy 3 and cross bar 2.

A portion of the ball 41 traverses through an opening 59 along the mounting plate 33 so as to extend toward the canopy 3. The opening 59 may be contoured or otherwise shaped to avoid binding between ball 41 and mounting plate 33. The threaded section 31 along the stem 30 engages threads along a cavity 62 through the ball 41. The threaded section 31 is secured to the ball 41 so that the shoulder 38 contacts the ball 41. A swivel clip 42 (not shown in FIG. 10) is secured to the mounting plate 33. By way of example only, the flanges 63 along the swivel clip 42 could be secured to either side of the mounting plate 33 whereby the flanges 63 slide onto opposed edges of the mounting plate 33. The swivel clip 42 surrounds at least two sides and top of the ball 41 so as to limit non-rotational movement of the ball 41 with respect to the crossbar 2 and the canopy 3. The swivel clip 42 should allow the ball 41 to rotate with respect to the mounting plate 33. A snap bushing 43 is secured about a hole 44 through the top of the swivel clip 42. A power cord 11 traverses the stem 30, ball 41, swivel clip 42, and snap bushing 43 between an illuminated fixture 46 (not shown) and a mounting structure 29. The second end of the stem 30 is secured to an illuminated fixture 46 via locknuts 36, 37 attached to the threaded section 32 adjacent to the shoulder 39, or as otherwise described herein. The cables 4, with or without cable assembly 5, are attached to the illuminated fixture 46 as described herein. An anchor 28 is located at the end of each cable 4 and contacts a socket 21, as otherwise described herein.

Figure 12:
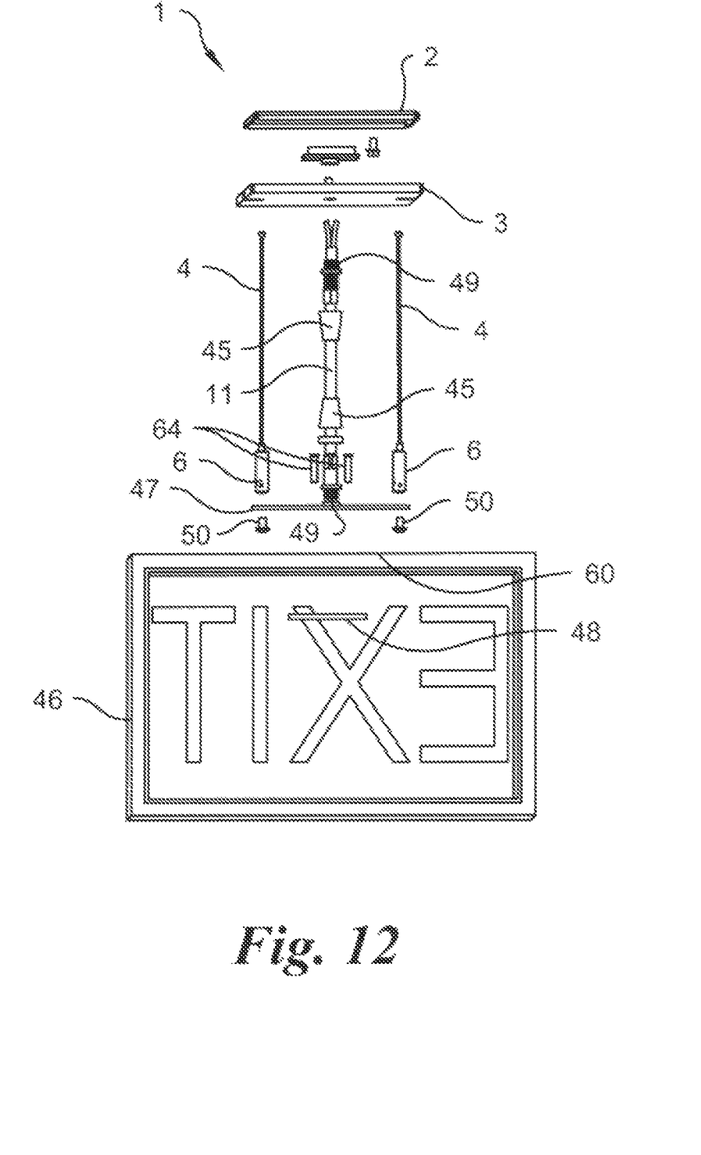
FIG. 12 is an exploded view illustrating a hanger system with an illuminated fixture in accordance with an embodiment of the invention.

Referring now to FIGS. 11 and 12, an illuminated fixture 46 is shown secured to a mounting structure 29 via a hanger system 1. The illuminated fixture 46 could be any device which includes at least one element that emits or transmits light. Non-limiting examples include light fixtures and signage.

A crossbar 2 is fastened to a mounting structure 29 via screws or other fasteners secured to the mounting structure 29 through two or more mounting slots 20, the latter shown in FIG. 3a. The canopy 3 is fastened to the crossbar 2 via mounting screws 12 which pass through holes 18, 22 mutually aligned through the canopy 3 and crossbar 2, respectively, as described herein.

When the power cord 11 is disposed between the canopy 3 and illuminated fixture 46 without a stem 30, a first strain relief 13 could be secured to the canopy along the power cord 11 and a second strain relief 14 secured to the illuminated fixture 46, as shown in FIG. 1. The power cord 11 may or may not be loading bearing. Optional caps 45 could be placed along the power cord 11. One cap 45 could cover the strain relief 13 and a portion of the power cord 11 at the interface with the canopy 3. Another cap 45 could cover the strain relief 14 and a portion of the power cord 11 at the interface with the illuminated fixture 46. Each cap 45 could interface with a grip base 49 to properly secure the cap 45 to the power cord 11. A bracket 47 could be mechanically secured to the power cord 11.

In other embodiments, a bracket 47 could contact an outer surface of the wall 60 along an illuminated fixture 46. A base 48 could contact an inner surface of the wall 60. Screws 64 could fasten the bracket 47 to the base 48 about the wall 60. It is also possible for each gripper 6 to be separately secured to the bracket 47 via a screw 50 which pass through the bracket 47 and engages a threaded opening along the gripper 6. The cables 4 may partially or completely bear the load of the illuminated fixture 46. The cables 4 are rotatable with respect to the slots 16.

Referring now to FIG. 13, an illuminated fixture 46 could be indirectly secured to the cables 4 of the hanger system 1 via a cable assembly 5. Each end of a cable 7 passes through a separate hole 55 along a wall 54 of an illuminated fixture 46. The anchors 8 at each end of the cable 7 are wider than the slot 52 along the paddle 9, thereby securing the paddle 9 to the cable 7. The hole 55 is larger than the cable 7 and anchor 8 but smaller than one dimension of the paddle 9, thus ensuring passage of anchor 8, cable 7, and paddle 9 through the hole 55. Each end of the cable 7 is secured to the wall 54 via the larger dimensional feature of the paddle 9. The cables 7 are attached to the illuminated fixture 46 about one or more light sockets 53 so as to properly apportion loading onto the cables 4.

As is evident from the explanation herein, the described invention is a hanger system which facilitates attachment of a fixture in a suspended fashion above an area. Accordingly, the described invention is expected to be used, by way of example only, in commercial, residential, industrial, and industrial settings with devices capable of projecting light.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A hanger system comprising:
 (a) a crossbar including at least two sockets, each said socket having a first slot;
 (b) a canopy disposed along and contacting one side of said crossbar, said canopy including at least two second slots, each said first slot substantially aligned with one said second slot;
 (c) at least two cables each having an anchor at a first end, one said anchor rotatably disposed within each said socket so that said cable extends through said first slot and said second slot, said cable rotatably disposed within said first slot and said second slot, each said cable having a second end attachable to a suspendible illuminated fixture;
 (d) a power cord that passes through said crossbar and said canopy, said sockets disposed about said power cord, said power cord electrically connectable to said suspendible illuminated fixture; and (e) a stem interposed between said crossbar and said suspendible illuminated fixture, said power cord basses through said stem.

2. The hanger system of claim 1, wherein said second end is attachable directly to said suspendible illuminated fixture.

3. The hanger system of claim 1, wherein said second end is attachable to said suspendible illuminated fixture via a gripper.

4. The hanger system of claim 1, wherein said second end is attachable to said suspendible illuminated fixture via a cable assembly.

5. The hanger system of claim 4, wherein said cable assembly includes a second cable with a pair of paddles separately attached thereto.

6. The hanger system of claim 1, wherein said stem is rigid.

7. The hanger system of claim 1, wherein said stem is flexible.

8. The hanger system of claim 1, further comprising:

(f) a mounting plate disposed adjacent to an opening along said canopy, said stem fastened at one end to said mounting plate and attachable at another end to said suspendible illuminated fixture.

9. The hanger system of claim 1, wherein said suspendible illuminated fixture is a light fixture.

10. The hanger system of claim 1, wherein said suspendible illuminated fixture is a display.

11. A hanger system comprising:

(a) a crossbar including at least two sockets, each said socket having a first slot;

(b) a canopy disposed along and contacting one side of said crossbar, said canopy including at least two second slots, each said first slot substantially aligned with one said second slot;

(c) at least two cables each having an anchor at a first end, one said anchor rotatably disposed within each said socket so that said cable extends through said first slot and said second slot, said cable rotatably disposed within said first slot and said second slot, each said cable having a second end attachable to a suspendible illuminated fixture;

(d) a power cord that passes through said crossbar and said canopy, said sockets disposed about said power cord, said power cord electrically connectable to said suspendible illuminated fixture;

(e) a mounting plate disposed adjacent to an opening along said crossbar; and (f) a stem interposed between said crossbar and said suspendible illuminated fixture, said stem having a ball at one end that rotatably contacts said mounting plate, said stem attachable at another end to said suspendible illuminated fixture, said power cord passes through said stem.

12. The hanger system of claim 11, further comprising:

(g) a swivel clip attached to said mounting plate, said swivel clip limiting non-rotational movement of said ball with respect to said crossbar and said canopy.

13. The hanger system of claim 11, wherein said stem is rigid.

14. The hanger system of claim 11, wherein said stem is flexible.

15. The hanger system of claim 11, wherein said suspendible illuminated fixture is a light fixture.

16. The hanger system of claim 11, wherein said suspendible illuminated fixture is a display.

17. A hanger system comprising:

(a) a crossbar including at least two sockets, each said socket having a first slot;

(b) a canopy disposed along and contacting one side of said crossbar, said canopy including at least two second slots, each said first slot substantially aligned with one said second slot;

(c) at least two cables each having an anchor at a first end, one said anchor rotatably disposed within each said socket so that said cable extends through said first slot and said second slot, said cable rotatably disposed within said first slot and said second slot, each said cable having a second end attachable to a suspendible illuminated fixture;

(d) a power cord that passes through said crossbar and said canopy, said sockets disposed about said power cord, said power cord electrically connectable to said suspendible illuminated fixture; and (e) a stem interposed between said crossbar and said suspendible illuminated fixture, said stem having a ball at one end rotatably disposed with respect to said canopy, said stem attachable at another end to said suspendible illuminated fixture, said power cord passes through said stem.

18. The hanger system of claim 17, wherein said stem is rigid.

19. The hanger system of claim 17, wherein said stem is flexible.

20. The hanger system of claim 17, wherein said suspendible illuminated fixture is a light fixture.

21. The hanger system of claim 17, wherein said suspendible illuminated fixture is a display.

* * * * *